United States Patent [19]

Gravitt

[11] Patent Number: 4,725,225
[45] Date of Patent: Feb. 16, 1988

[54] PORTABLE CHEMICAL HEATER

[75] Inventor: William H. Gravitt, Coral Springs, Fla.

[73] Assignee: Scientific Utility Products, Inc., Pompano Beach, Fla.

[21] Appl. No.: 4,328

[22] Filed: Jan. 16, 1987

[51] Int. Cl.⁴ .............................................. F23D 3/24
[52] U.S. Cl. ...................................... 431/320; 431/298
[58] Field of Search ............... 431/298, 320, 324, 344; 126/265

[56] References Cited

U.S. PATENT DOCUMENTS

| | | | |
|---|---|---|---|
| 41,846 | 3/1864 | Hutchinson | 431/320 |
| 1,681,140 | 8/1928 | Spear | 431/324 |
| 3,994,672 | 11/1976 | Novak | 431/320 |
| 4,013,397 | 3/1977 | Neugart | 431/320 |
| 4,126,408 | 11/1978 | Cox | 431/320 |
| 4,477,247 | 10/1984 | Kumasaka | 431/320 |
| 4,494,926 | 1/1985 | Riha | 431/324 |
| 4,604,053 | 8/1986 | de La Rosa | 431/320 |
| 4,608,011 | 8/1986 | Comstock | 431/320 |
| 4,611,986 | 9/1986 | Menter et al. | 431/320 |
| 4,624,633 | 11/1986 | Bandel | 431/344 |

Primary Examiner—Samuel Scott
Assistant Examiner—H. A. Odar
Attorney, Agent, or Firm—Michael Ebert

[57] ABSTRACT

A portable chemical heater for cooking or warming food, the heater including a can filled with diethylene glycol fluid. The can is provided at its top with a protruding neck that is normally closed by a removable cap. Seated within the neck is a cup-shaped sealing insert having a bore therein through which projects the upper end of a wick. This wick is formed by a bundle of glass fibers, the remaining portion of the wick extending into the can and being immersed in the fluid.

4 Claims, 5 Drawing Figures

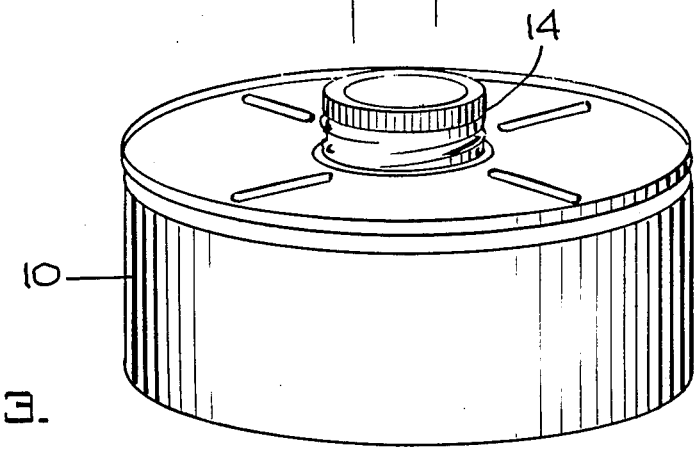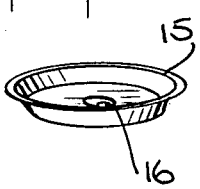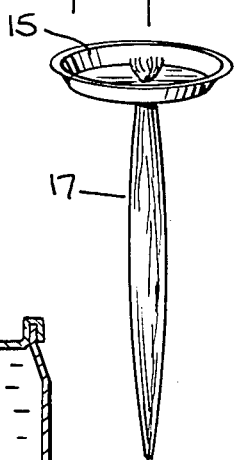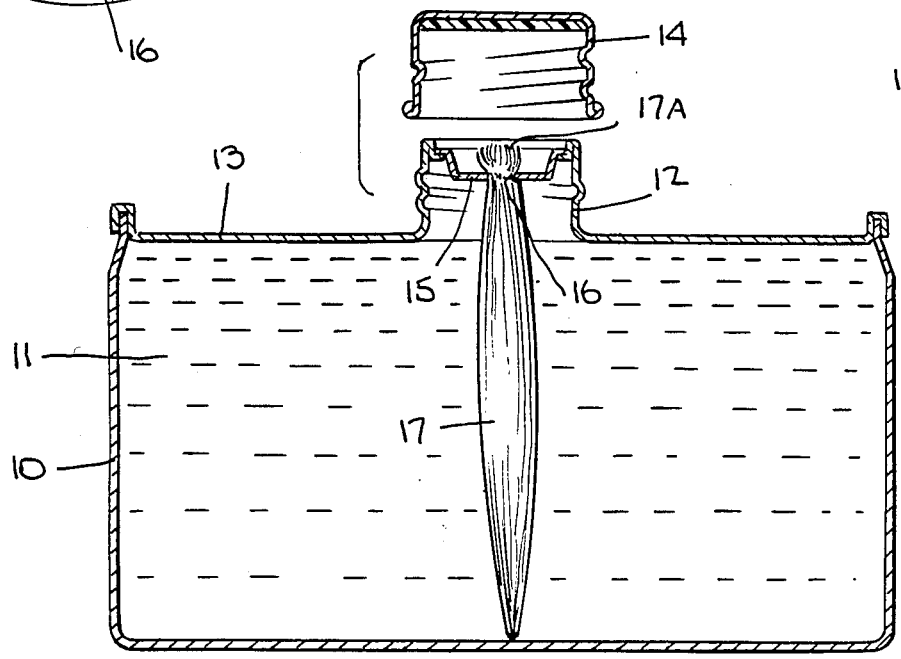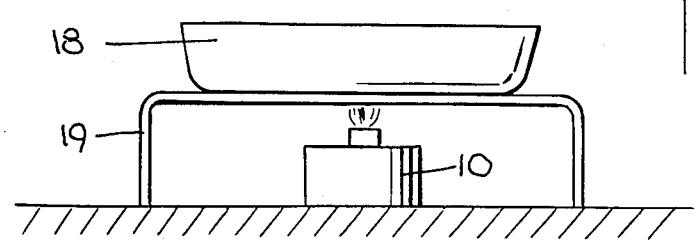

PORTABLE CHEMICAL HEATER

BACKGROUND OF INVENTION

1. Field of Invention

This invention relates generally to portable chemical heaters for warming or cooking food, and more particularly to a heater of this type which uses diethylene glycol as a liquid fuel and which, despite its small size, is capable of generating heat for a prolonged period.

2. Status of Prior Art

In order to heat or warm food at a table or buffet, it is known to provide for this purpose a chafing dish or other food receptacle below which is placed a portable chemical heater.

The portable heater is usually of the STERNO type; that is, it takes the form of a can filled with an alcohol-based paste which when the exposed surface of the paste is ignited produces a flame of sufficient intensity to warm precooked food contained in the chafing dish or to cook food at a table or buffet.

One practical difficulty with known types of portable heaters of the STERNO type is that they have a short effective life that runs about a half hour. In practice, this period is often inadequate, particularly if the food is to be maintained in a warm condition for several hours.

Another drawback characteristic of known types of portable chemical heaters having fuel contained in a can is that the heat generated thereby is transferred to the can as well as to the chafing dish being heated; hence one not only experiences a loss of useful heat, but the heated can constitutes a hazard. Thus, if the user wishes to remove an exhausted can and replace it with a fresh can, he may be burned when grasping the exhausted can. Or if the user wishes, before the can is exhausted, to blow out the flame and put a lid on the can for subsequent use, in doing so he may be burned when handling the can.

Moreover, where the can is provided with a label of paper or other flammable material, the heat from the can may result in ignition of the paper, especially if the paper label is soiled by an ignitable cooking oil, as sometimes occurs. Yet another disadvantage of chemical heaters which use an alcohol-based paste is that they are smokey in operation and produce a disagreeable odor.

SUMMARY OF INVENTION

In view of the foregoing, the main object of this invention is to provide a portable chemical heater that is relatively small, yet has a prolonged effective life during which it generates a smoke-free, odorless flame.

More particularly, an object of the invention is to provide a heater of the above type which makes use of a wick formed by a bundle of glass fibers immersed in a fuel contained in a can to produce a flame that is concentrated in the region above the wick. Hence little heat is transferred to the can so that it is safe to handle even after the heater has been in operation for some time.

Also an object of the invention is to provide a disposable portable heater of the above type which can be manufactured at low cost.

Yet another object of the invention is to provide a chemical heater which is effectively leakproof, so that even if the can containing the liquid fuel is uncapped and accidentally turned over, the fuel will not be discharged therefrom.

A heater in accordance with the invention has many indoor or outdoor uses, and can be used to heat or warm food in chafing dishes, hot food carts, buffets, as well as at camp sites and at picnics. And the heater can be used in various emergency situations where electrically-operated or other types of heaters are not available or are not in working order.

A significant advantage of the invention resides in the fact that the wick formed of a bundle of glass fibers is supported by a miniature cup-shaped insert that snaps into the neck of the can, and that to assemble the heater one has merely to push the upper end of the wick through a bore in this insert and then snap the insert into the neck, thereby immersing the wick in the liquid fuel contained in the can.

Briefly stated, these objects are attained in a portable chemical heater for cooking or warming food, the heater including a can filled with diethylene glycol fluid. The can is provided at its top with a protruding neck that is normally closed by a removable cap. Seated within the neck is a cup-shaped sealing insert having a bore therein through which projects the upper end of a wick. This wick is formed by a bundle of glass fibers, the remaining portion of the wick extending into the can and being immersed in the fluid.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a portable chemical heater in accordance with the invention, in the closed state;

FIG. 2 is a section taken through the heater, with the cap removed therefrom;

FIG. 3 is a separate perspective view of the insert;

FIG. 4 shoWs the wick joined to the insert; and

FIG. 5 illustrates schematically the manner in which the heater acts to heat a chafing dish.

DESCRIPTION OF INVENTION

Referring now to FIGS. 1 and 2, there is shown a portable chemical heater in accordance with the invention, the heater including a small, cylindrical metal can 10 filled with diethylene glycol fluid 11.

This non-corrosive fluid, which is clear, colorless and practically odorless, is normally used as a solvent, a plasticizer or as a surfactant. We have found, however, that this fluid is capable of functioning as an excellent smokeless fuel, and that a 7.5 fluid ounce supply in a small can is sufficient to produce a steady flame for a seven hour period. Hence a small can is capable of prolonged operation, usually far in excess of what is required in a given situation. Thus, if the heater is used for an hour under the chafing dish, and there is no further need for heat, the chemical heater may be extinguished and stored for future use.

Because a small can has a prolonged effective operating life, there is no need, say, on a camping trip, to take along a large supply of cans, for normally only a few cans are needed, thereby lightening the camping load requirements.

Can 10 is provided with an upwardly protruding neck 12 centered on its top wall 13. Neck 12 is externally-threaded to receive a removable cap 14. Snapping into neck 12 and seated securely therein is a small, cup-shaped sealing insert 15 having a center bore 16.

Projecting through bore 16 in insert 15 is the upper end 17A of a wick 17 formed by a bundle of glass fibers. This bundle, which may be formed by a bunch of fiberglass ropes, is compressible so that it can be forced through bore 15 without difficulty, the unrestrained upper end of the wick then blooming out. The remaining portion of wick 17 which extends into the can below insert 15 is immersed in liquid fuel 11.

The advantage of a fiberglass wick as against, say, a conventional cotton wick, is that it will not burn and carbonize, and will act only to draw the fluid by capillary action from the can to provide a steady supply of the liquid to the exposed upper end of the wick. The length of the wick is such as to reach the bottom of the can so as to draw up all of the liquid therefrom.

The bundle of glass fibers is of sufficient thickness so that when it is compressed in the bore of the insert it effectively seals the can, and the only fluid that is discharged from the can is that drawn by capillary action to the exposed end of the wick. Hence if the can is accidentally turned over when the cap is removed, there will be no leakage of the fuel.

Insert 15 is of the type used to seal oil, turpentine and other liquid-containing cans which are not adequately sealed by a screw-on cap, thereby avoiding any leakage or evaporation during storage. After the cap is removed, one normally punches a hole in this sealing insert in order to provide access to the fluid contents of the can. But in the present invention, the insert is provided with a bore to accommodate and support the wick, so that once the cap is removed, the heater is in condition for operation.

In assembling the heater, one first links the wick 17 to the insert 15, as shown in FIG. 4. Then after the can is filled with liquid fuel, the wick is immersed therein and the insert snapped into or otherwise secured in place in neck 12. Finally, cap 14 is screwed onto the neck. The cap is preferably provided with a gasket to engage the rim of the neck to ensure a good seal.

In practice, as shown in FIG. 5, when the heater is put to use, its cap is removed, and the heater 10 placed below a chafing dish 18 supported at a raised position on a table by a stand 19. A lighted match is then applied to the wick to ignite the fuel. In order to extinguish the burner, one merely blows out the flame. The chemical heater is disposable, for once the fuel is exhausted from the can it cannot be replenished. However, the heater is a low cost device made up of inexpensive components, so that it is more practical to discard the heater rather than to replenish the fuel supply.

While there has been shown and described a preferred embodiment of a portable chemical heater in accordance with the invention, it will be appreciated that many changes and modifications may be made therein without, however, departing from the essential spirit thereof. Thus instead of diethylene glycol, one may use kerosene as the fuel.

I claim:

1. A portable chemical heater comprising:
   A. a can filled with a liquid fuel and provided at its top with an upwardly protruding neck that is normally closed by a removable screw-on cap and is intergral with the top, said neck being externally threaded to receive said screw-on cap which is provided with a gasket that engages the rim of the neck;
   B. a small cup-shaped snap-in insert seated within the neck adjacent the rim thereof and provided with a central bore; and
   C. a wick whose upper end is projected through the boer in the insert and is exposed and whose remaining portion extends into the can and is immersed in the liquid fuel to draw said fuel to the exposed upper end whereby when the wick is ignited, a flame is produced whose heat is concentrated in the region above the exposed end and is not transferred to the can, said wick being formed by a compressible bundle of glass fibers which are compressed within the bore in the insert and has a thickness which effectively seals the can whereby the only liquid discharged from the can is by way of the capillary action of the fibers.

2. A heater as set forth in claim 1, wherein said fuel is diethylene glycol.

3. A heater as set forth in claim 1, wherein said fuel is kerosene.

4. A heater as set forth in claim 1, wherein said can is cylindrical and said neck is cylindrical and is centered on top of the can.

* * * * *